United States Patent
Arena et al.

(10) Patent No.: US 10,866,591 B2
(45) Date of Patent: Dec. 15, 2020

(54) SCHEDULING AND MANAGEMENT OF DELIVERIES VIA A VIRTUAL AGENT

(71) Applicant: VERIZON CONNECT IRELAND LIMITED, Dublin (IE)

(72) Inventors: Valerio Arena, Florence (IT); Francesco Sambo, Padua (IT); Leonardo Sarti, Sesto Fiorentino (IT); Matteo Simoncini, Pistoia (IT); Nicola Tommasi, Verona (IT)

(73) Assignee: Verizon Connect Ireland Limited, Basking Ridge, NJ (US)

( * ) Notice: Subject to any disclaimer, the term of this patent is extended or adjusted under 35 U.S.C. 154(b) by 484 days.

(21) Appl. No.: 15/851,198

(22) Filed: Dec. 21, 2017

(65) Prior Publication Data
US 2019/0196502 A1 Jun. 27, 2019

(51) Int. Cl.
| G05D 1/02 | (2020.01) |
| G06Q 10/08 | (2012.01) |
| G08G 1/00 | (2006.01) |
| G08G 1/0967 | (2006.01) |
| G06N 20/00 | (2019.01) |

(52) U.S. Cl.
CPC ........... *G05D 1/0291* (2013.01); *G06N 20/00* (2019.01); *G06Q 10/0833* (2013.01); *G06Q 10/08355* (2013.01); *G08G 1/096741* (2013.01); *G08G 1/202* (2013.01)

(58) Field of Classification Search
CPC ............ G05D 1/0291; G06Q 10/0833; G06Q 10/08355; G08G 1/096741; G08G 1/202
See application file for complete search history.

(56) References Cited

U.S. PATENT DOCUMENTS

| 2014/0330739 A1* | 11/2014 | Falcone | ........... G06Q 10/08355 705/338 |
| 2019/0130354 A1* | 5/2019 | Han | ................... G06Q 10/0833 |

OTHER PUBLICATIONS

Hetal Bhavsar, "A Comparative Study of Training Algorithms for Supervised Machine Learning", 2012, p. 74-76 (Year: 2012).*

* cited by examiner

*Primary Examiner* — George Chen
*Assistant Examiner* — Ibrahim N El-Bathy

(57) ABSTRACT

A device can receive a request for a schedule that assigns a fleet of vehicles to a set of deliveries. The device can determine that a parameter is not included in the request that is needed to generate a new schedule or that is needed to generate an existing schedule. The device can obtain the parameter using a historical user request, a historical schedule, or a scheduling template. The device can generate or obtain the schedule based on information included in the request and the obtained parameter. The device can provide the schedule to a user device and/or to one or more devices associated with the fleet of vehicles carrying out the set of deliveries. The device can modify the schedule based on a trigger. The device can provide the modified schedule to the user device and/or to the one or more devices associated with the fleet of vehicles.

17 Claims, 7 Drawing Sheets

SCHEDULING AND MANAGEMENT OF DELIVERIES VIA A VIRTUAL AGENT

BACKGROUND

A manager or a scheduler can schedule delivery of goods and/or services for an organization. For example, a fleet manager for a shipping company can schedule a team of drivers to perform a set of deliveries.

DETAILED DESCRIPTION OF PREFERRED EMBODIMENTS

Figure 1A:
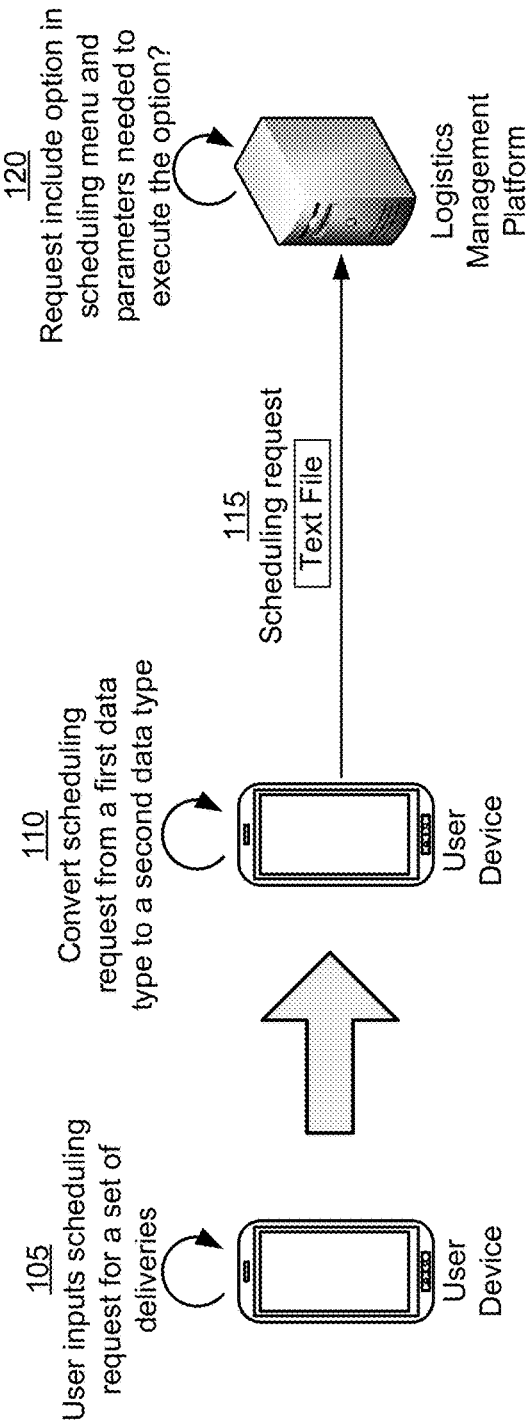
FIGS. 1A-1D are diagrams of an overview of an example implementation described herein.

The following detailed description of example implementations refers to the accompanying drawings. The same reference numbers in different drawings can identify the same or similar elements.

An organization can provide delivery of goods and/or services to particular locations. For example, an organization can utilize a team of drivers and a fleet of vehicles to deliver millions, even billions, of goods and/or services to various locations worldwide. In this case, the organization might need a team of managers to handle logistics for thousands, tens of thousands, hundreds of thousands, or more of deliveries needed to deliver the goods and/or services.

However, using a team of managers to manually create schedules for the thousands, the tens of thousands, the hundreds of thousands, or more of deliveries can be a cumbersome, error prone process. Additionally, real-time modifications to the schedules can further complicate the matter. For example, real-time placement of new orders can alter delivery paths of vehicles, existing customers can change order delivery times or delivery locations, delivery drivers can call in sick, and/or the like.

Some implementations described herein provide a logistics management platform to interact with a virtual assistant to schedule and manage a set of deliveries. For example, the logistics management platform can receive, from a user device, a request for a schedule that assigns a team of drivers and a fleet of vehicles to a set of deliveries. In this case, assume the request is a request to generate a new schedule.

Additionally, the logistics management platform can determine whether the request includes a set of parameters needed to generate the new schedule. For example, to generate the new schedule, the request might need to include information identifying a list of available drivers and vehicles, information identifying one or more delivery locations, information identifying a delivery time or a delivery time range for a delivery, and/or the like.

Additionally, the logistics management platform can generate the new schedule using the information included in the request. For example, the logistics management platform can generate the new schedule by executing a routing function that, based on the information included in the request, determines one or more optimal routes that the team of drivers and the fleet of vehicles can use to perform the set of deliveries. Furthermore, the logistics management platform can provide the new schedule for display on a user interface of the user device and/or to one or more devices associated with drivers and vehicles tasked with carrying out the set of deliveries.

In this way, the logistics management platform conserves processing resources that might otherwise be used to correct scheduling errors involved in manually created schedules. Furthermore, the logistics management platform reduces a utilization of computing resources by generating an optimal schedule on a first attempt, thereby avoiding expending additional computing resources on error correction techniques, schedule generation of subsequent iterations of the schedule, and/or the like.

FIGS. 1A-1D are diagrams of an overview of an example implementation 100 described herein. As shown in FIGS. 1A-1D, example implementation 100 provides a logistics management platform that interacts with a virtual assistant to obtain a schedule for a set of deliveries and to perform real-time modifications to the schedule.

As shown in FIG. 1A, and by reference number 105, a user can input a request for a set of deliveries. For example, the user can interact with a user interface of a user device to launch a scheduling program that allows the user to schedule deliveries for goods and/or services. In this case, the user can interact with the user interface of the scheduling program to select voice communications as a mode to use for providing the request. Additionally, the user can speak into the user device to provide the request. The request can be a first request to generate a new schedule or a second request to load an existing schedule.

As an example, the user can launch the scheduling program, which can cause the virtual assist to state "Welcome to the scheduler, please provide a request." In this example, the user might speak into the user device to provide the following request: "Please load delivery schedule from last Tuesday."

As shown by reference number 110, the user device can convert the request from a first data type to a second data type. For example, if the request is of a first data type (e.g., a data type associated with an audio file), then the user device can convert the request to a second data type that is capable of being processed by the logistics management platform (e.g., a data type associated with a text file). In some cases, the user device can provide the request to the logistics management platform while the request is of the first data type, and the logistics management platform can convert the request to the second data type.

As shown by reference number 115, the user device can provide the request to the logistics management platform. For example, the user device can provide, to the logistics management platform, a text file that includes the contents of the request (e.g., the message "please load delivery schedule from last Tuesday.").

As shown by reference number 120, the logistics management platform can determine whether the request includes a particular option in the scheduling menu and whether the request includes a set of parameters needed to execute the option. For example, the logistics management platform can analyze (e.g., parse) the request using a natural language processing technique to determine that the request includes the phrase "load delivery schedule," which is a match with a menu option "load existing schedule."

Additionally, the logistics management platform can further analyze the request to determine whether the request includes one or more parameters needed to execute the menu option. As shown in this example, the menu option for loading an existing schedule includes a delivery schedule identifier parameter and a date parameter. In this case, the logistics management platform can analyze the request to determine that the request does not include the delivery schedule identifier parameter.

In this way, the logistics management platform is able to receive a request and is able to determine whether the request includes information needed to load the existing schedule.

Figure 1B:
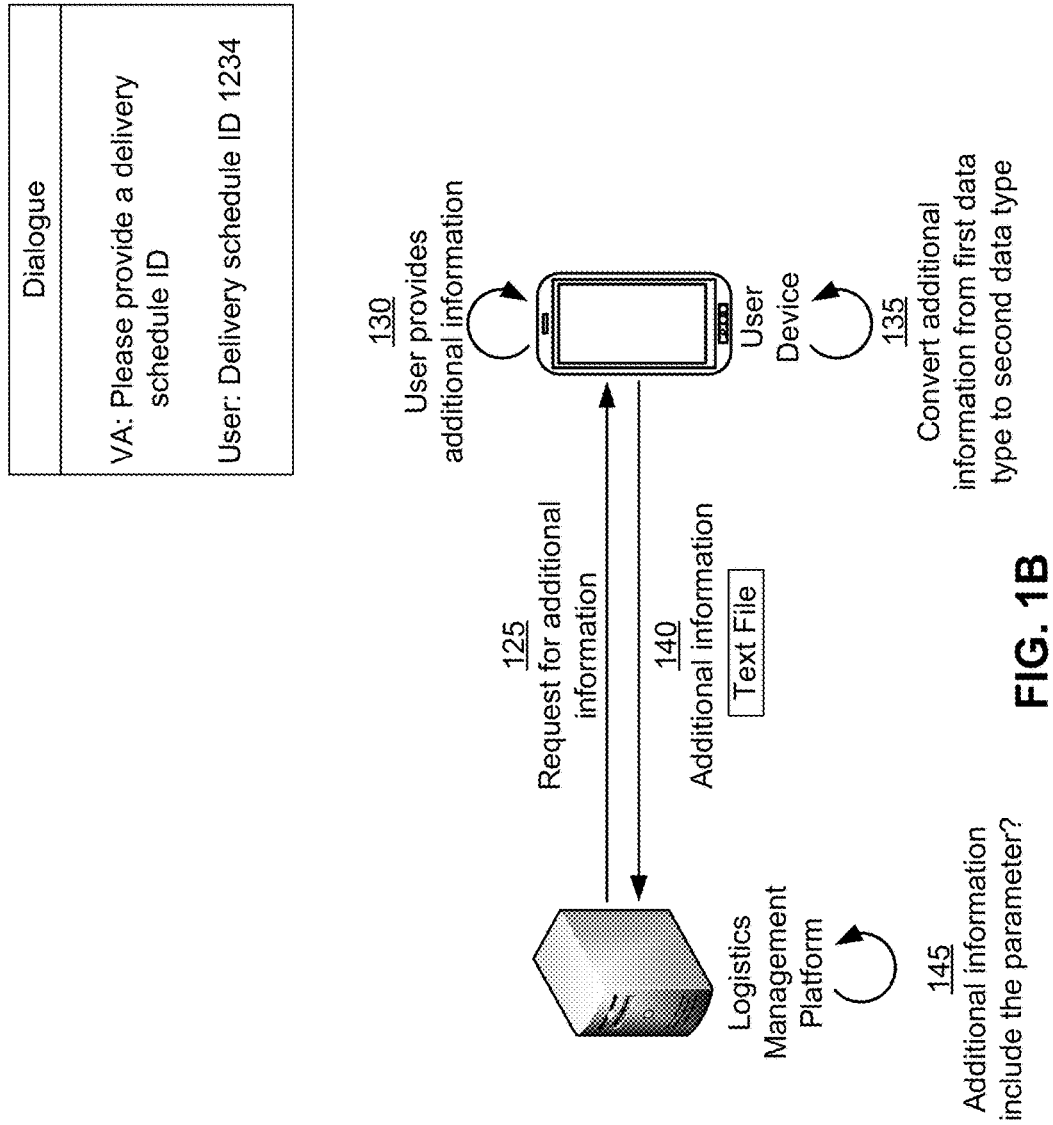

As shown in FIG. 1B, and by reference number 125, the logistics management platform can provide, to the user device, a request for additional information, such as the delivery schedule ID. In this case, the virtual assistant can provide the request for the additional information to the user as a voice command stating "please provide a delivery schedule ID."

As shown by reference number 130, the user can interact with the user interface of the scheduling program of the user device to provide the additional information. For example, the user can speak into the user interface of the scheduling program to provide the additional information, which can be stored on the user device as an audio file. As shown, the user can provide the following delivery schedule ID: "Delivery schedule ID 1234."

As shown by reference number 135, the user device can convert the additional information from the first data type to the second data type, in the same manner described above. As shown by reference number 140, the user device can provide the additional information the logistics management platform.

As shown by reference number 145, the logistics management platform can determine whether the additional information includes the parameter needed the process the request. For example, the logistics management platform can compare the additional information (e.g., "delivery schedule ID 1234" to the parameter (delivery schedule ID) to confirm that the parameter has been provided.

In this way, the logistics management platform is able to obtain all information needed to process the request.

Figure 1C:
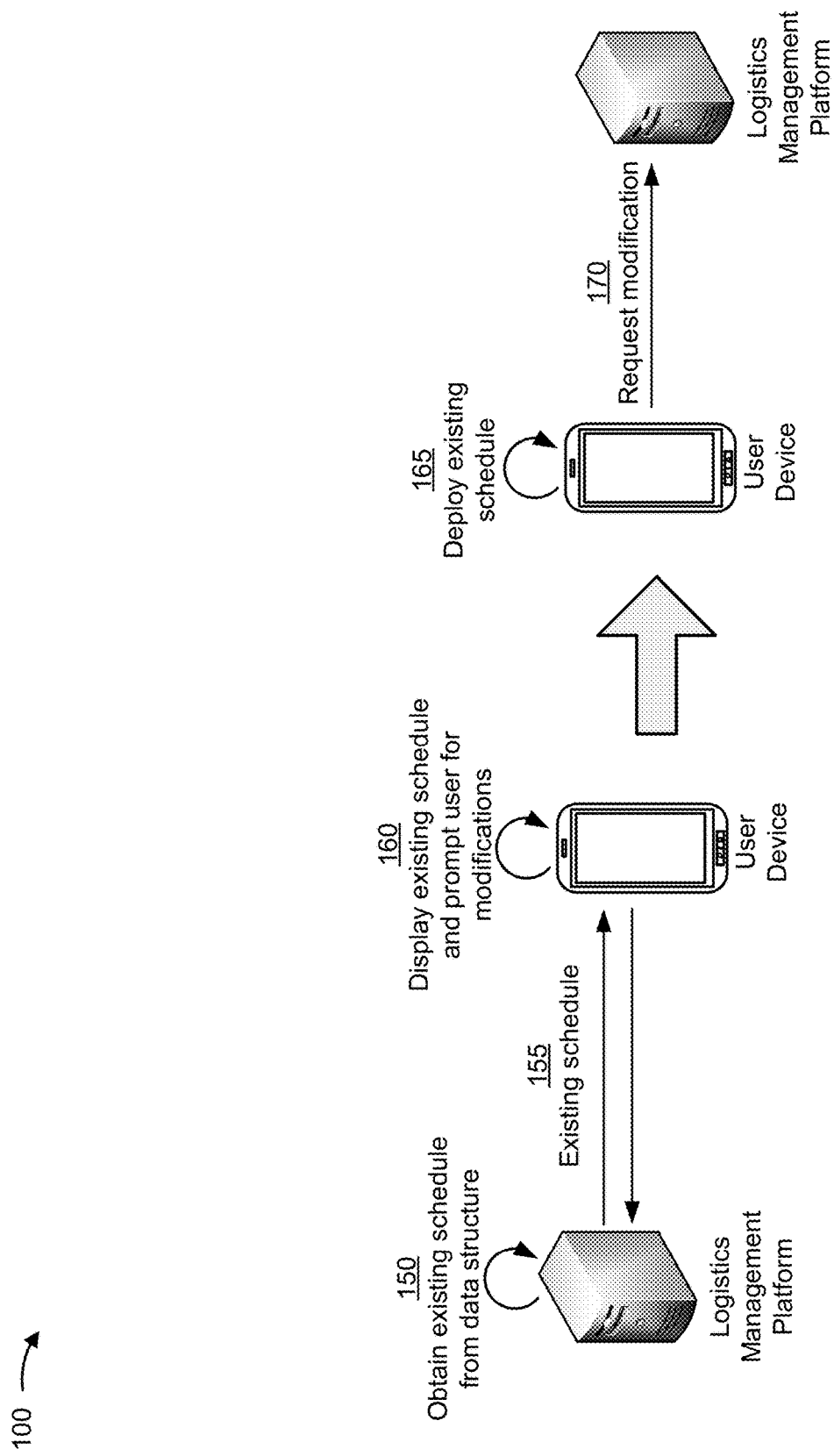

As shown in FIG. 1C, and by reference number 150, the logistics management platform can obtain the existing schedule from a data structure. For example, the logistics management platform can store a set of existing schedules, and can use the delivery schedule ID and/or the date to identify the existing schedule. As shown by reference number 155, the logistics management platform can provide the existing schedule to the user device.

As shown by reference number 160, the user device can display the existing schedule. For example, the user device can display the existing schedule on the user interface of the scheduling program. In this case, the virtual assistant can display a prompt on the user interface to ask the user if any modifications to the existing schedule are needed. As an example, assume the user declines, and plans to use the existing schedule as-is.

As shown by reference number 165, the user device can deploy the existing schedule. For example, the user device can deploy the existing schedule, such that the existing schedule is sent to one or more devices associated with drivers and vehicles tasked with carrying out the set of deliveries. As shown by reference number 170, the user device can provide a request to modify the existing schedule to the logistics management platform. For example, a driver named Bob can call in sick, which might require removing the driver from the list of available drivers on the existing schedule.

In this way, the logistics management platform is able to interact with the virtual assistant to provide the existing schedule to the user device to allow the user device to deploy the existing schedule. Furthermore, the logistics management platform is able to receive real-time requests to modify the existing schedule.

Figure 1D:
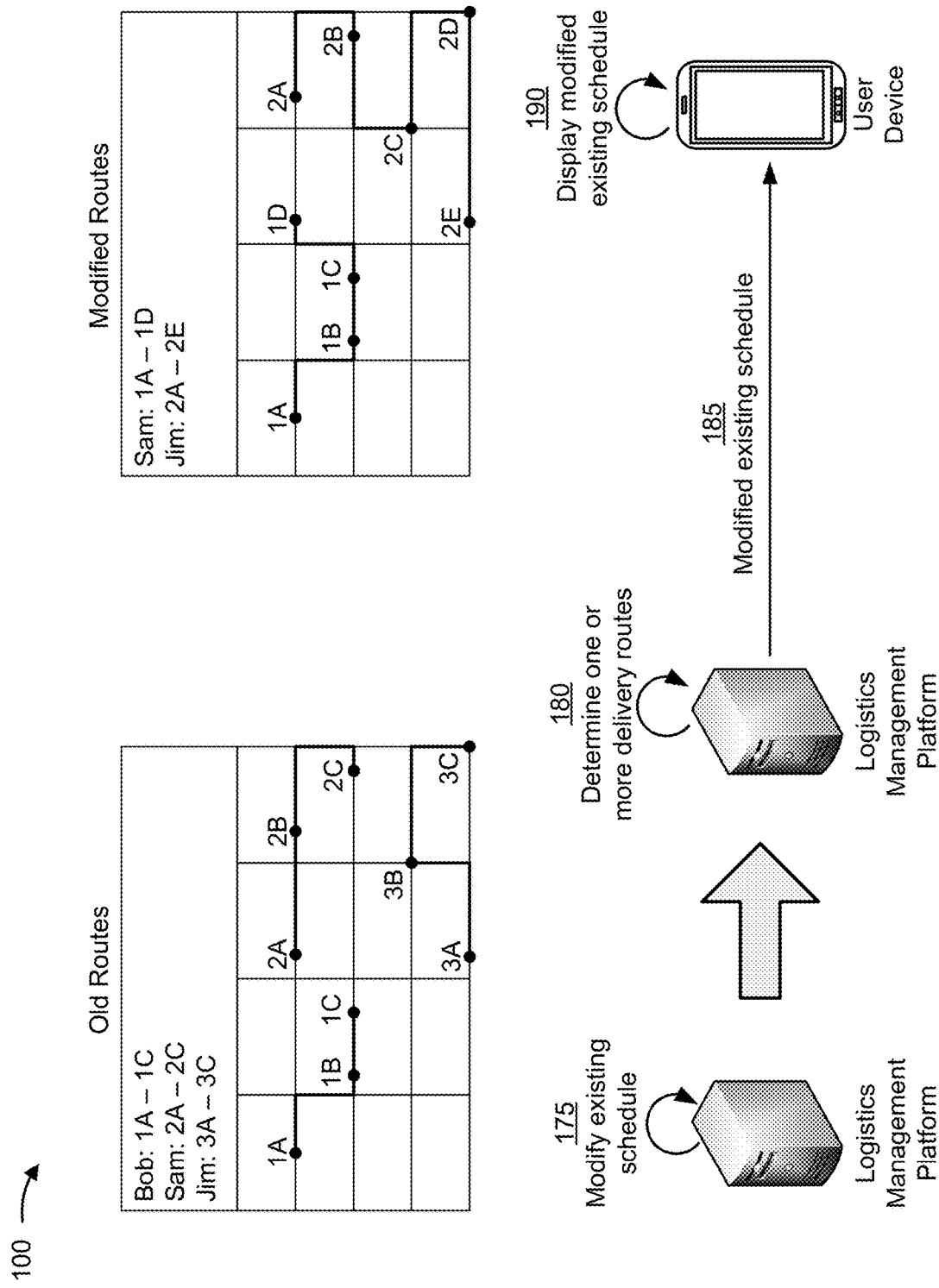

As shown in FIG. 1D, and by reference number 175, the logistics management platform can modify the existing schedule. For example, the logistics management platform can remove driver Bob from the list of available drivers based on the request to modify the existing schedule.

In some implementations, the logistics management platform can modify the existing schedule based on a trigger. For example, as shown, the logistics management platform can modify the existing schedule based on receiving the request to modify the existing schedule from the user device. In other cases, the logistics management platform can modify the existing schedule based on supplemental information obtained while the team of drivers are performing the set of deliveries (e.g., weather information, traffic information, etc.), based on an output of a forecasting technique, as described further herein, and/or the like.

As shown by reference number 180, the logistics management platform can determine one or more delivery routes for the set of deliveries included in the existing schedule. For example, the logistics management platform can execute a routing function (e.g., a function to determine a shortest path, such as Dijkstra's function) to determine one or more delivery routes for the set of deliveries. In this case, the logistics management platform can modify one or more old routes to account for the modification to the existing schedule.

As an example, the logistics management platform can determine one or more delivery routes using a list of available drivers that excludes Bob. In this example, the delivery destinations previously assigned to Bob are allocated between Sam and Jim, and are assigned in a way that allows both Sam and Jim to perform deliveries in a timely, cost effective manner.

In some implementations, rather than load and modify the existing schedule, the logistics management platform can generate a new schedule and modify the new schedule. For example, the logistics management platform can use an artificial intelligence technique and/or a machine learning technique to generate a new schedule. Additional information regarding generating the new schedule and use of artificial intelligence techniques and/or natural language processing techniques are provided further herein.

In some implementations, the logistics management platform can load existing schedules and/or generate new schedules for thousands, tens of thousands, even hundreds of thousands of user devices 210. For example, the logistics management platform can process a large volume of requests concurrently, can utilize a batch scheduling and processing technique to process the requests, and/or the like. In this way, the logistics management platform is able to process large volumes of data, such that a human operator or an inferior logistics management platform would be objectively unable to process.

As shown by reference number 185, the logistics management platform can provide the modified existing schedule to the user device. As shown by reference number 190, the user device can display the modified existing schedule on the user interface. Additionally, the logistics management platform and/or the user device can provide the modified schedule to one or more devices associated with the drivers and vehicles tasked with carrying out the deliveries (e.g., a device associated with Sam and Sam's vehicle and a device associated with Jim and Jim's vehicle).

In this way, the logistics management platform is able to provide and manage a schedule that organizes a set of deliveries. Furthermore, the logistics management platform reduces a utilization of computing resources by generating an optimal schedule as soon as a modification to the schedule becomes available, thereby avoiding utilization of additional computing resources on error correction techniques, schedule generation of subsequent iterations of the schedule, and/or the like.

As indicated above, FIGS. 1A-1D are provided merely as an example. For example, while example implementation 100 involves scheduling a set of deliveries, in practice, other implementations can schedule routes that transport people (e.g., a taxi service), schedule work within an organization, schedule appointments, and/or the like.

Other examples are possible and can differ from what was described with regard to FIGS. 1A-1D. For example, there can be additional devices and/or networks, fewer devices and/or networks, different devices and/or networks, or differently arranged devices and/or networks than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of environment 100 can perform one or more functions described as being performed by another set of devices of environment 100.

Figure 2:
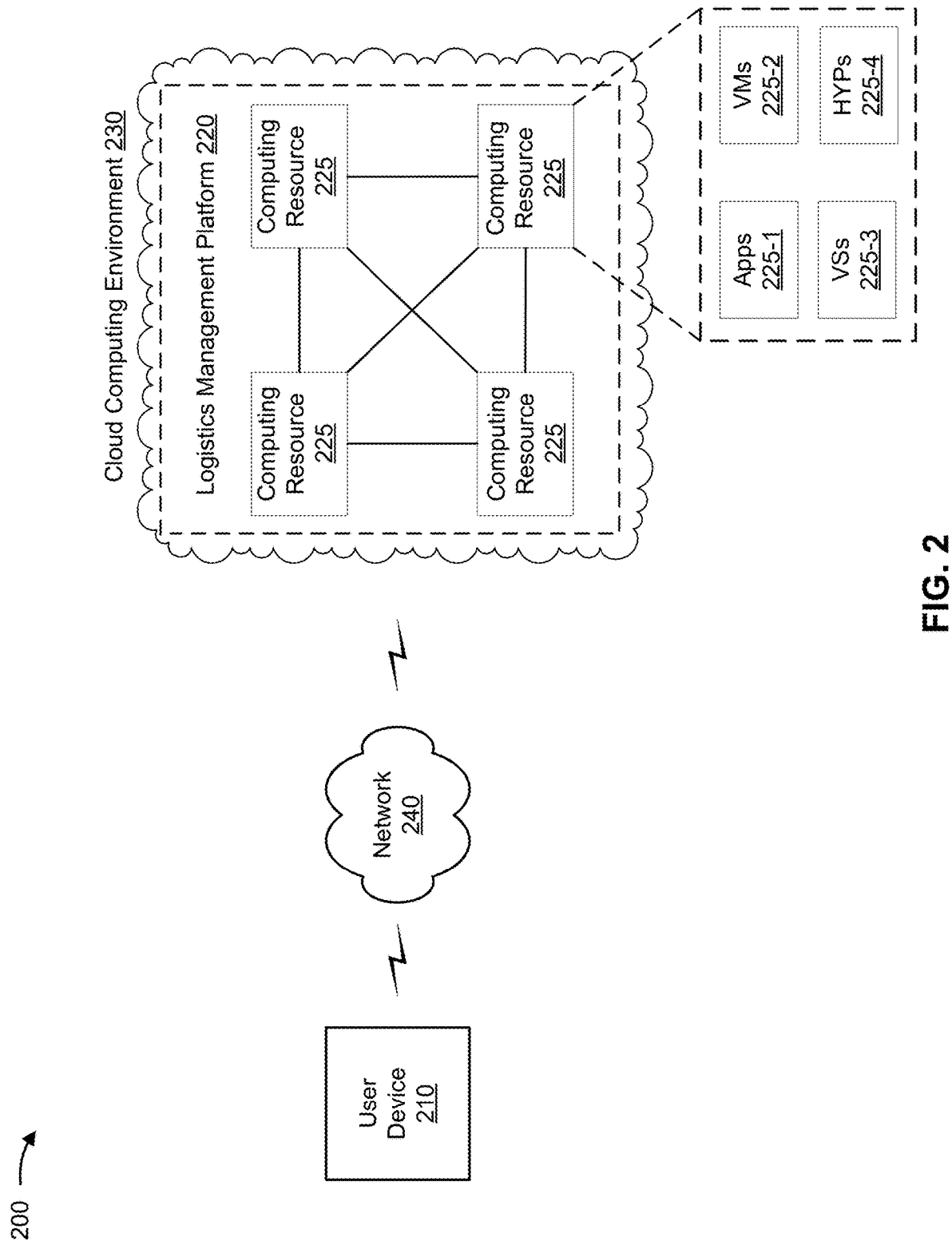
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a logistics management platform 220 hosted by a cloud computing environment 230, and/or a network 240. Devices of environment 200 can interconnect via wired connections, wireless connections, optical connections, or a combination of connections.

User device 210 includes one or more devices capable of receiving, generating, storing, processing, and/or providing information associated with scheduling a set of deliveries. For example, user device 210 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, an electronic control unit (ECU) of a vehicle, an engine control module (ECM) of a vehicle, or a similar type of device.

In some implementations, user device 210 can provide a request for a set of navigational directions to logistics management platform 220. In some implementations, user device 210 can provide a request for a set of deliveries to logistics management platform 220. In some implementations, user device 210 can receive a request for additional information from logistics management platform 220. In this case, user device 210 can provide the additional information to logistics management platform. In some implementations, user device 210 can receive a schedule (e.g., a new schedule, an existing schedule, etc.) from logistics management platform 220. In some implementations, user device 210 can provide a request to modify the schedule to logistics management platform 220. In this case, user device 210 can receive a modified schedule from logistics management platform 220.

Logistics management platform 220 includes one or more devices capable of receiving, storing, generating, processing, and/or providing information associated with scheduling a set of deliveries. For example, logistics management platform 220 can include a server device (e.g., a host server, a web server, an application server, etc.), a data center device, or a similar device.

In some implementations, logistics management platform 220 can support a conversational application programming interface (API) (e.g., a virtual agent) to manage requests made by user device 210. Additionally, or alternatively, logistics management platform 220 can support a schedule management API capable of creating and/or modifying a schedule. In some cases, the conversational API and the schedule management API can be hosted by the same cloud platform (e.g., logistics management platform 220). In other cases, the conversational API and the schedule management API can be hosted by separate cloud platforms (e.g., logistics management platform 220, a third-party cloud platform, etc.).

In some implementations, logistics management platform 220 can obtain supplemental information from a data source. For example, one or more reporting devices can obtain supplemental information, such as weather information, traffic information, parking information, and/or the like, and can provide the supplemental information to the data source. In this case, logistics management platform 220 can obtain the supplemental information via a query, automatically based on a trigger, such as an expiration of a timer, and/or the like. The one or more reporting devices can include a sensor, such as, for example, a camera, a sensor located near a parking lot or near an intersection, a vehicle sensor, a sensor affixed to a drone, a weighting mechanism, such as an inductive loop capable of detecting the presence of a vehicle, a sensor capable of detecting weight or vehicle length, a pneumatic tube counting device, a sensor capable of performing weather readings, and/or the like.

In some implementations, as shown, logistics management platform 220 can be hosted in cloud computing environment 230. Notably, while implementations described herein describe logistics management platform 220 as being hosted in cloud computing environment 230, in some implementations, logistics management platform 220 might not be cloud-based (i.e., can be implemented outside of a cloud computing environment) or might be partially cloud-based.

Cloud computing environment 230 includes an environment that hosts logistics management platform 220. Cloud computing environment 230 can provide computation, software, data access, storage, and/or other services that do not require end-user knowledge of a physical location and configuration of system(s) and/or device(s) that host logistics management platform 220. As shown, cloud computing environment 230 can include a group of computing resource 225 (referred to collectively as "computing resources 225 and individually as "computing resource 225").

Computing resource 225 includes one or more personal computers, workstation computers, server devices, or another type of computation and/or communication device. In some implementations, computing resource 225 can host logistics management platform 220. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by user device 210. Application 225-1 can eliminate a need to install and execute the software applications on user device 210. For example, application 225-1 can include software associated with logistics management platform 220 and/or any other software capable of being provided via cloud computing environment 230. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., user device 210), and can manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
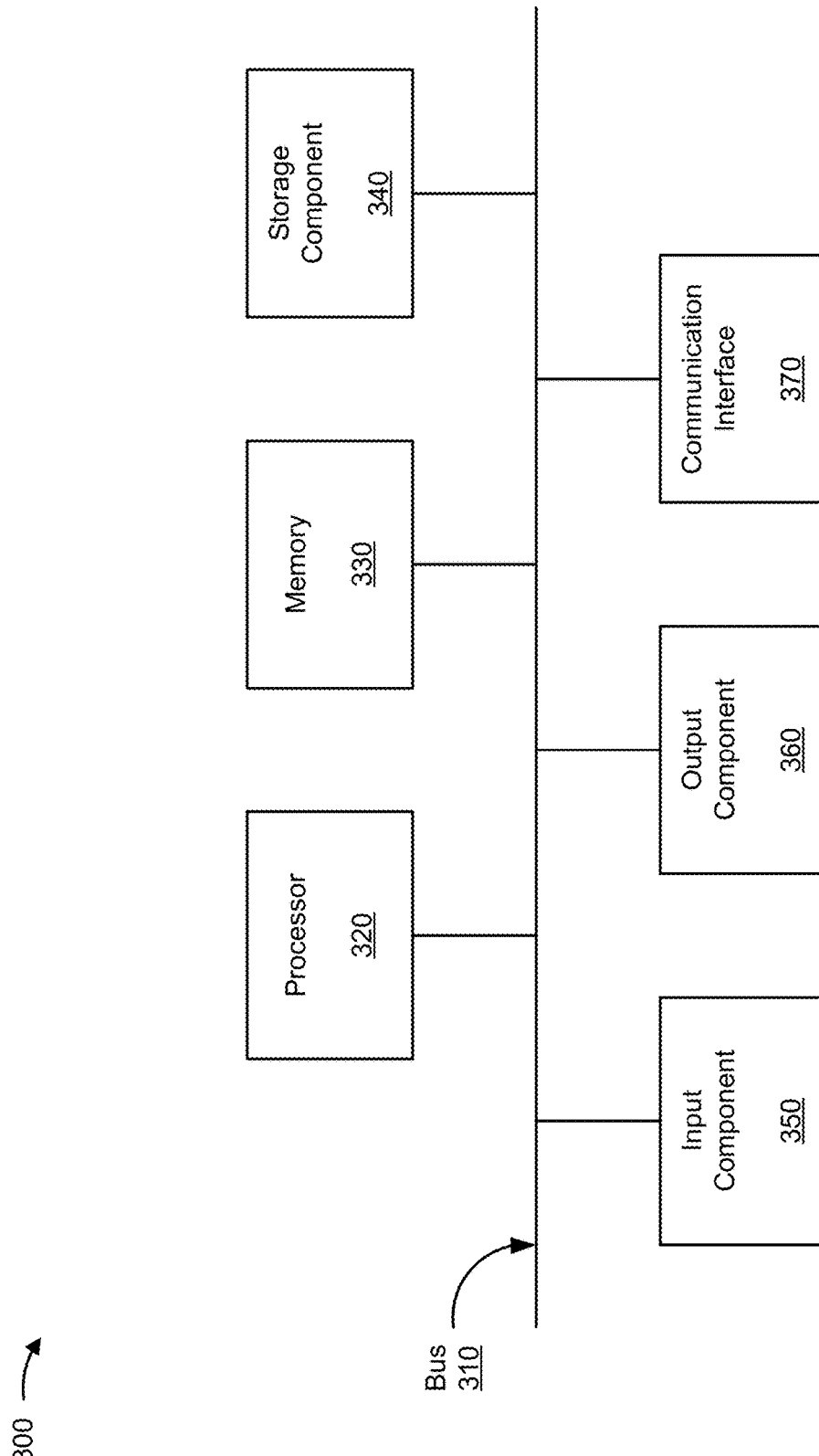
FIG. 3 is a diagram of example components of one or more devices of FIG. 2.

FIG. 3 is a diagram of example components of a device 300. Device 300 can correspond to user device 210, logistics management platform 220, and/or computing resource 225. In some implementations, user device 210, logistics management platform 220, and/or computing resource 225 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
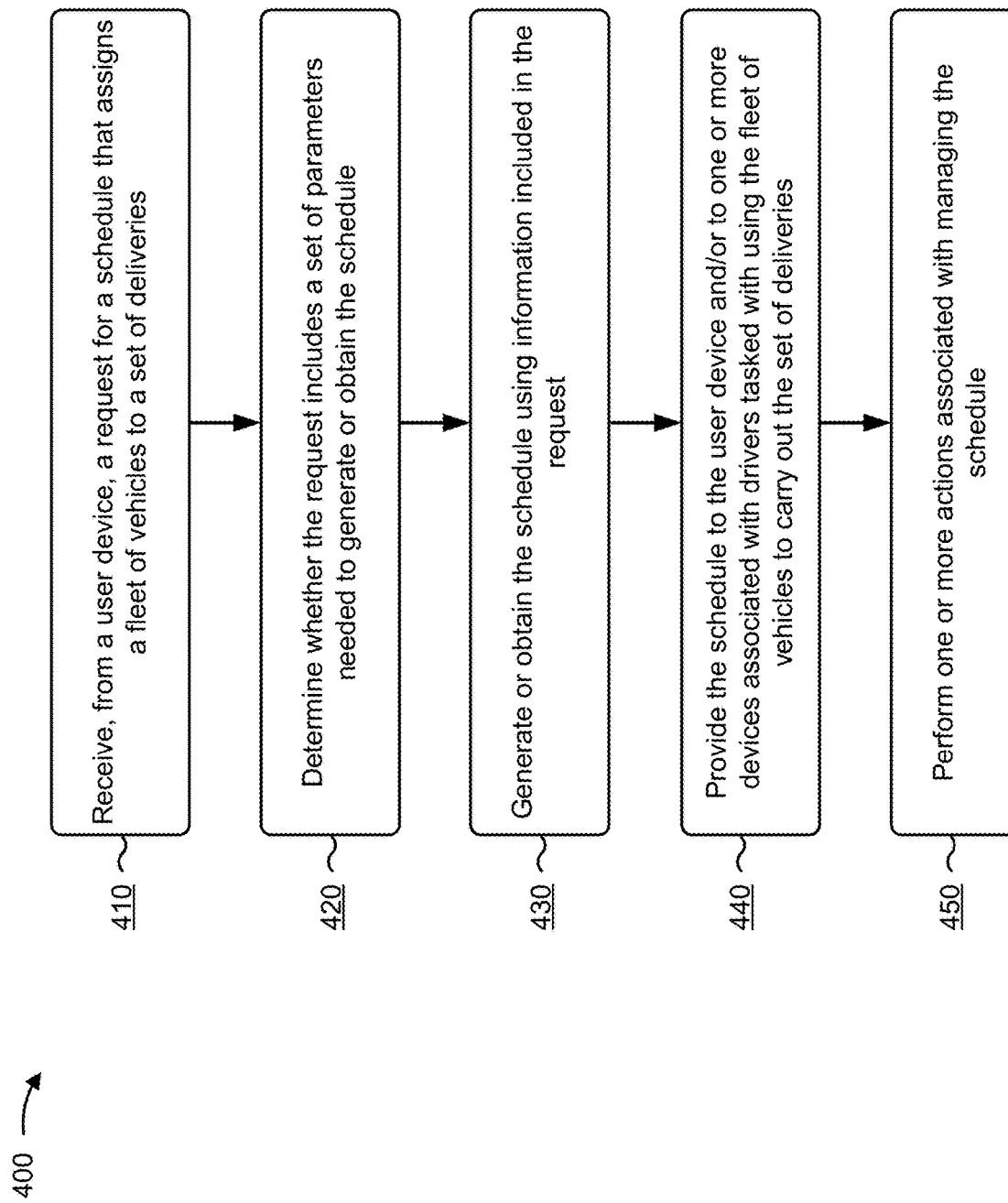
FIG. 4 is a flow chart of an example process for interacting with a virtual agent to create, modify, and/or provide a delivery schedule that assigns a team of drivers to perform a set of deliveries.

FIG. 4 is a flow chart of an example process 400 for interacting with a virtual agent to create, modify, and/or provide a delivery schedule that assigns a team of drivers to perform a set of deliveries. In some implementations, one or more process blocks of FIG. 4 can be performed by logistics management platform 220. In some implementations, one or more process blocks of FIG. 4 can be performed by another device or a group of devices separate from or including logistics management platform 220, such as user device 210.

As shown in FIG. 4, process 400 can include receiving, from a user device, a request for a schedule that assigns a fleet of vehicles to a set of deliveries (block 410). For example, logistics management platform 220 can receive, from user device 210, a first request to generate a new schedule that can be used to perform a set of deliveries or a second request to load an existing schedule that can be used to perform the set of deliveries. A schedule can be used to assign a set of delivery routes to a team of drivers and a fleet of vehicles, such that the team of drivers and the fleet of vehicles are able to use the set of delivery routes to perform the set of deliveries. The schedule can be stored electronically via a scheduling program, thereby allowing the schedule to be sent to devices associated with the team of drivers (e.g., the schedule can be sent to a mobile device of each driver, of the team of drivers) and/or devices associated with the fleet of vehicles.

In some implementations, a user can input a request via the scheduling program of user device 210. For example, the user can interact with a user interface of user device 210 to launch the scheduling program, which can prompt the user to input the request. In this case, the user can input the request by inputting text, by speaking into user device 210, using hand motions that are detectable by a sensor hosted on user device 210, and/or the like.

In some implementations, logistics management platform 220 can receive a request to generate a new schedule. The request to generate the new schedule can include driver information (e.g., information indicating a number of available drivers, information identifying each available driver, etc.), route information (e.g., information identifying a geographic location for a delivery, information identifying a delivery time for the delivery, etc.), and/or the like.

In some implementations, logistics management platform 220 can receive a request to load an existing schedule. The request to load the existing schedule can include information identifying the existing schedule (e.g., a schedule ID), information indicating a time or a date at which the existing schedule was previously used, and/or the like. In some cases, the existing schedule can be used as-is for performing the set of deliveries. In other cases, user device 210 can request the existing schedule, and can make one or modifications to the existing schedule, as described further herein. By re-using portions of existing schedules, rather than re-creating new schedules for each request, logistics management platform 220 conserves processing resources relative to re-creating new schedules during each request.

In some implementations, logistics management platform 220 can convert the request from a first data type to a second data type. For example, logistics management platform 220 can analyze the request to determine that the request is of a first data type, such as a data type associated with an audio file or a media file. In this case, logistics management platform 220 can convert the request from the first data type to a second data type that is capable of being processed, such as a data type associated with a text file. In some implementations, user device 210 can convert the request from the first data type to the second data type, and can provide converted request to logistics management platform 220.

In some implementations, logistics management platform 220 can receive requests from a group of user devices 210. For example, an organization might support thousands, even millions, of deliveries, and can use a team of fleet managers or schedulers to orchestrate scheduling of the deliveries. In this case, each fleet manager or scheduler can interact with a user device 210 to provide requests for one or more schedules or provide requests to load one or more existing schedules. In this way, logistics management platform 220 is able to receive requests from a group of user devices 210, and is able to process requests such that thousands, even millions, of deliveries are able to be scheduled.

In this way, logistics management platform 220 is able to receive a request for a schedule that assigns a team of drivers to perform a set of deliveries.

As further shown in FIG. 4, process 400 can include determining whether the request includes a set of parameters needed to generate or obtain the schedule (block 420). For example, logistics management platform 220 can determine whether the first request includes a first set of parameters needed to generate the new schedule or whether the second request includes a second set of parameters needed to load the existing schedule.

In some implementations, logistics management platform 220 can store the first set of parameters needed to generate the new schedule or the second set of parameters needed to load the existing schedule. For example, logistics management platform 220 can store parameters using a data structure, such as a linked-list, an array, a hash table, a tree, a graph, a database, and/or the like. The first set of parameters needed to generate the new schedule can include a parameter identifying a driver and vehicle (e.g., at least one driver and vehicle is needed to generate the new schedule), a parameter identifying a geographic location for a delivery (e.g., at least one delivery is needed to generate the new schedule), a parameter identifying a delivery time or a delivery time range for the delivery, and/or the like. The second set of parameters needed to load the existing schedule can include a schedule identifier parameter associated with the existing schedule, a parameter identifying a date at which the existing schedule was generated or last used, and/or the like.

In some implementations, if the request is a request to generate a new schedule, then logistics management platform 220 can determine whether the request includes a minimum amount of information needed to generate the new schedule. For example, logistics management platform 220 can analyze the information included in the request to determine whether the request includes a minimum number of drivers, a minimum number of delivery locations, time information each delivery, and/or any other configurable parameter that can serve to set a minimum amount of information needed to generate the new schedule.

In some implementations, if the request is a request to load an existing schedule, then logistics management platform 220 can determine whether the request includes the second set of parameters needed to load the existing schedule. For example, logistics management platform 220 can determine whether the request includes the second set of parameters needed to load the existing schedule, in the same manner described above.

In some implementations, logistics management platform 220 can obtain additional information needed to process the request. For example, assume logistics management platform 220 determines that the first request does not include a parameter, of the first set of parameters needed to generate the new schedule or, or that the second request does not include a parameter, of the second set of parameters, needed to load the existing schedule. In this case, logistics management platform 220 can provide, to user device 210, a request for additional information needed to process the first request or the second request. Here, the virtual assistant of the scheduling program can prompt the user to input the additional information, and the additional information can be provided to logistics management platform 220.

In some implementations, logistics management platform 220 can determine that a parameter is missing from the request, and can automatically identify a parameter to use for the request. For example, logistics management platform 220 can determine that a first parameter of the first set of parameters is not included in the request or that a second of the second set of parameters is not included in the request. In this case, logistics management platform 220 can obtain the first parameter or the second parameter using a set of historical user requests, a set of historical schedules, a set of scheduling templates, and/or the like.

In some implementations, logistics management platform 220 can use the set of historical user requests to clarify ambiguity in the request provided by user device 210. For example, logistics management platform 220 can compare one or more terms included in the request provided by user device 210 to a set of historical user requests to determine that a term, of the one or more terms, is a short-hand, slang, or abbreviated version of the first parameter or the second parameter that had been identified as missing from the request provided by user device 210.

As an example, a user can provide a request that states "please load delivery schedule from last Tue." In this example, logistics management platform 220 can compare one or more terms included in the request to historical user requests to determine that the user often uses "Tue" to mean "Tuesday." In this case, logistics management platform 220 can use a date associated with "last Tuesday" as the date parameter needed to further process the request.

Additionally, or alternatively, logistics management platform 220 can use the set of historical user requests to obtain a parameter to use in conjunction with the request provided by user device 210. For example, logistics management platform 220 can analyze (e.g., parse) the set of historical user requests to identify a historical user request that satisfies a threshold level of similarity with the request provided by user device 210. In this case, logistics management platform 220 can identify a historical parameter included in the historical user request that is not included in the request provided by user device 210, and can recommend the historical parameter to user device 210 (e.g., the identified parameters can be spoken or provided to the user via the virtual assistant). In other cases, logistics management platform 220 can automatically select the identified historical parameter to be used in generating the new schedule or obtaining the existing schedule.

Additionally, or alternatively, logistics management platform 220 can use the set of historical schedules to obtain a parameter to use in conjunction with the request provided by user device 210. For example, logistics management platform 220 can analyze (e.g., parse) the set of historical schedules to identify a historical schedule that satisfies a threshold level of similarity with the request provided by user device 210. In this case, logistics management platform 220 can identify a historical parameter used to generate the historical schedule that is not included in the request provided by user device 210, and can recommend the historical parameter to user device 210. In other cases, logistics management platform 220 can automatically select the historical parameter to be used in generating the new schedule or in obtaining the existing schedule.

In some implementations, rather than use the set of historical schedules, logistics management platform 220 can use scheduling templates to obtain a parameter to use in conjunction with the request provided by user device 210. For example, logistics management platform 220 can use scheduling templates to obtain a parameter to use with the request in the same manner described above. A scheduling template can be a combination of one or more historical schedules, and can include a set of parameters that describe terms of the schedule.

In this way, logistics management platform 220 is able to determine whether the request includes parameters needed to generate the new schedule or to load the existing schedule.

As further shown in FIG. 4, process 400 can include generating or obtaining the schedule using information included in the request (block 430). For example, logistics management platform 220 can generate the new schedule using the information included in the first request and a routing function. Alternatively, logistics management platform 220 can obtain the existing schedule by using the information included in the second request to query a data structure. The new schedule or the existing schedule can include a complete plan for each delivery, of the set of deliveries, including an indication of which driver will perform each delivery, and in what order the deliveries are to be performed.

In some implementations, logistics management platform 220 can generate the new schedule. For example, if the request is a request to generate the new schedule, the request can include driver information and route information that can be used to generate the new schedule. In this case, logistics management platform 220 can generate the new schedule by using the driver information and the route information as input to a routing function that can be used to determine a set of routes for the new schedule. As an example, logistics management platform 220 can use a number of available drivers and vehicles, and geographic location information for the set of deliveries as input to a routing function (e.g., a function to determine a shortest path, such as Dijkstra's function) to determine a delivery route for each driver, of the team of available drivers.

In some implementations, logistics management platform 220 can use supplemental information to generate the new schedule. For example, logistics management platform 220 can obtain supplemental information from a data source, and can use the supplemental information and the information included in the request as input to the routing function. The supplemental information can include vehicle information (e.g., indicating a number of available vehicles, indicating a size of each available vehicle, indicating fuel availability of each available vehicle, indicating a maintenance condition of each available vehicle, etc.), additional driver information (e.g., medical information relating to a driver, credential information for a driver, such as a particular license that might limit a type of vehicle or route that the driver can take), weather information, traffic information, and/or the like. In some cases, the supplemental information can be included in the request made by user device 210. Furthermore, more supplemental information (e.g., additional weather information, additional traffic information, etc.) can be sent in real-time while the team of drivers and fleet of vehicles are performing the set of deliveries, as described further herein.

In some implementations, logistics management platform 220 can use a machine learning technique to generate the new schedule. For example, logistics management platform 220 can train a data model with a set of historical schedules. In this case, logistics management platform 220 can provide information included in the request and/or supplemental information as input to the data model to cause the data model to output one or more coefficient values associated with particular routes that can be used as part of the new schedule. As an example, a coefficient value can be 1.0 if a particular route is a fastest-available route or a shortest-possible distance, 0.0 if a particular route is a slowest-available route or longest-possible distance, and a value between 1.0 and 0.0 for any values in between the fastest-available route and the slowest-available route and the shortest-possible distance and the long-possible distance.

As an example, the data model can output a coefficient value for each possible route, of a set of routes, and can generate a recommendation to use routes with scores that satisfy a threshold value. In other cases, logistics management platform 220 can use the output of the data model to automatically select one or routes to use for the new schedule.

In some implementations, logistics management platform 220 can use an artificial intelligence technique to generate the new schedule. For example, logistics management platform 220 can provide information included in the request as input to an artificial intelligence technique, such as a neural network. In this case, the artificial intelligence technique can be used to process the information included in the request, and can output route information, driver information, and/or the like, needed to generate the new schedule.

In some implementations, logistics management platform 220 can generate a set of new schedules and/or a set of existing schedules. For example, logistics management platform 220 can receive requests from thousands, even tens of thousands of user devices 210 for new schedules and/or existing schedules. In this case, logistics management platform 220 can generate the set of new schedules and/or the set of existing schedules concurrently, based on order received using a batch processing technique, and/or the like. Furthermore, logistics management platform 220 can modify the set of new schedules and/or the set of existing schedule based on receiving thousands of modification requests from user devices 210, in the same manner.

In some implementations, logistics management platform 220 can use one or more existing schedules to generate the new schedule. For example, logistics management platform 220 can compare information included in the request to one or more existing schedules to identify a target schedule. In this case, logistics management platform 220 can generate the new schedule based on the target schedule. In this way, logistics management platform 220 conserves computing resources relative to generating the new schedule without utilizing the one or more existing schedules.

In some implementations, logistics management platform 220 can obtain the existing schedule. For example, the request can include a schedule identifier associated with the existing schedule, and logistics management platform 220 can use the schedule identifier to obtain the existing schedule from a data structure. In some cases, logistics management platform 220 can also use time information (e.g., a date at which the existing schedule was created) to obtain the existing schedule.

In this way, logistics management platform 220 is able to generate or obtain the schedule.

As further shown in FIG. 4, process 400 can include providing the schedule to the user device and/or to one or more devices associated with drivers using the fleet of vehicles to carry out the set of deliveries (block 440). For example, logistics management platform 220 can provide the new schedule or the existing schedule to user device 210 and/or to one or more devices associated with drivers and vehicles tasked with carrying out the set of deliveries.

In some implementations, logistics management platform 220 can provide the new schedule or the existing schedule to user device 210. For example, logistics management platform 220 can provide the new schedule or the existing schedule to user device 210 such that a user of user device 210 (e.g., a manager, such as a fleet manager) can view the schedule on a user interface.

In some implementations, logistics management platform 220 can provide at least a portion of the new schedule or the existing schedule to the one or more devices associated with drivers tasked with carrying out the set of deliveries. For example, logistics management platform 220 can provide at least a portion of the new schedule or the existing schedule to a device that is in close physical proximity of drivers (e.g., a driver's mobile device, an onboard computer system installed on a vehicle etc.) to allow drivers to view the new schedule or the existing schedule.

In some implementations, logistics management platform 220 can modify the existing schedule. For example, logistics management platform 220 can provide the existing schedule to user device 210, which can cause the virtual assistant associated with the scheduling program to ask the user if a modification is needed. In this case, a user can input a modification in the same manner described above, and user device 210 can provide the modification to logistics management platform 220. Furthermore, logistics management platform 220 can modify the existing schedule based on the modification provided by user device 210. In this case, logistics management platform 220 might need to re-determine delivery routes needed to perform the set of deliveries (e.g., if a route is added or removed). Moreover, logistics management platform 220 can provide the modified schedule to user device 210 and/or the one or more devices associated with drivers and vehicles tasked with carrying out the set of deliveries.

In this way, logistics management platform 220 is able to provide the schedule to one or more interested parties.

As further shown in FIG. 4, process 400 can include performing one or more actions associated with managing the schedule (block 450). For example, logistics management platform 220 can modify the new schedule or the existing schedule based on a trigger (e.g., based on a request from user device 210, based on supplemental information, based on a forecasting technique, etc.), generate a recommendation to modify the schedule, and/or the like.

In some implementations, logistics management platform 220 can modify the schedule based on a request from user device 210. For example, logistics management platform 220 can receive a request from user device 210 to modify the schedule. In this case, the request can be associated with a real-time change to the schedule, such as a driver calling in sick, a new delivery being added to the schedule or removed from the schedule, and/or the like. Additionally, logistics management platform 220 can modify the schedule using information included in the request. In some cases, such as when a delivery is added or removed, logistics management platform 220 can re-determine the set of delivery routes needed to perform the set of deliveries. Furthermore, logistics management platform 220 can provide the modified schedule (e.g., the modified new schedule, the modified existing schedule) to user device 210 and/or to the one or more devices associated with drivers tasked with carrying out the set of deliveries.

Additionally, or alternatively, logistics management platform 220 can modify the schedule based on additional supplemental information. For example, logistics management platform 220 can, while the set of deliveries are being performed, periodically obtain additional supplemental information. The additional supplemental information can include additional weather information for a geographic region associated with the set of deliveries, additional traffic information for the geographic region associated with the set of deliveries, and/or the like. In this case, logistics management platform 220 can use the additional supplemental information and real-time information associated with the set of deliveries (e.g., a current location of drivers, an indication of which deliveries have been completed, etc.) to re-determine delivery routes for the set of deliveries. If the re-determined delivery routes are more efficient than the old delivery routes (e.g., if the re-determined delivery routes are a shorter total distance than the old set of delivery routes), then logistics management platform 220 can modify the schedule and provide the modified schedule to user device 210 and/or to the one or more devices associated with the drivers and vehicles tasked with carrying out the deliveries.

Additionally, or alternatively, logistics management platform 220 can modify the new schedule or the existing schedule based on a forecasting technique. For example, logistics management platform 220 can execute a forecasting technique to predict a likelihood of a particular scheduling modification occurring. In this case, logistics management platform 220 can use the forecasting technique to analyze a set of historical schedules and/or a set of historical modification requests to determine the likelihood of the particular scheduling modification occurring. Here, logistics management platform 220 can determine that the likelihood of the particular scheduling modification occurring satisfies a threshold value, and can modify the new schedule or the existing schedule prior to the particular scheduling modification occurring.

Additionally, or alternatively, logistics management platform 220 can generate a recommendation to modify the schedule. For example, logistics management platform 220 can apply one or more of the above-mentioned techniques, and, rather than automatically modify the schedule, can generate a recommendation to modify the schedule. In this case, logistics management platform 220 can provide the recommendation to user device 210 to allow a user to determine whether to modify the schedule.

In this way, logistics management platform 220 is able to perform one or more actions associated with managing the schedule.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, logistics management platform 220 conserves processing resources that might otherwise be used to correct scheduling errors involved in manually created schedules. Furthermore, logistics management platform 220 reduces utilization of computing resources by generating an optimal schedule on the first attempt, thereby avoiding utilization of additional computing resources on error correction techniques, schedule generation of subsequent iterations of the schedule, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a user device, a request for a schedule that assigns a fleet of vehicles to a set of deliveries,
wherein the request for the schedule is:
a first request to generate a new schedule, or
a second request to load an existing schedule;
determine that a first parameter, of a first set of parameters needed to generate the new schedule, is not included in the first request or that at a second parameter, of a second set of parameters needed to load the existing schedule, is not included in the second request;
obtain the first parameter or the second parameter using:
a historical user request comprising:
analysis of a set of historical user requests to identify the historical user request, the historical user request satisfying a threshold level of similarity with the first request or with the second request,
identify a historical parameter included in the historical user request that is not included in the first request or in the second request,
obtain the historical parameter included in the historical user request, and use the historical parameter as the first parameter or as the second parameter, the historical parameter to be provided to the user device as a recommended parameter or to be automatically used to generate the new schedule or to obtain the existing schedule,
generate the new schedule or obtain the existing schedule based on information included in the request and one of the first parameter or the second parameter, wherein the new schedule or the existing schedule is generated based on one or more machine learning or artificial intelligence techniques, the new schedule or the existing schedule including:
driver information for a team of drivers associated with the fleet of vehicles, and
route information for a set of routes to be used for performing the set of deliveries,
wherein the machine learning comprises:
training a data model using a set of historical data schedules; and
providing information included in the request as input to the data model to cause the data model to output one or more coefficient values associated with particular routes, of the set of routes to be used as part of the new schedule, and to generate a recommendation to use the particular routes with scores satisfying a threshold value;
provide the new schedule or the existing schedule to at least one of:
the user device, or
one or more devices associated with the fleet of vehicles carrying out the set of deliveries;
receive, while the fleet of vehicles are carrying out the set of deliveries, a trigger;
modify the new schedule or the existing schedule based on the trigger; and
provide the modified new schedule or the modified existing schedule to at least one of:
the user device, or
the one or more devices associated with the fleet of vehicles carrying out the set of deliveries.

2. The device of claim 1, the first set of parameters include at least one of:
a parameter identifying a driver, of the team of drivers associated with the fleet of vehicles,
a parameter identifying a geographic location for a delivery, of the set of deliveries, or
a parameter identifying a delivery time or delivery time range for a delivery, of the set of deliveries; and
where the second set of parameters includes at least one of:
a schedule identifier parameter associated with the existing schedule, or
a parameter identifying a date at which the existing schedule was generated.

3. The device of claim 1, where the one or more processors are further to:
determine, after receiving the request from the user device, that the request is of a first data type; and
convert the request from the first data type to a second data type,
where the second data type is in a format capable of being processed by the device.

4. The device of claim 1, where the one or more processors, when determining whether the first request includes the first set of parameters, are to:
determine that the first request does not include a parameter of the first set of parameters;
where the one or more processors are further to:
provide a request for additional information to the user device,
where the request for additional information includes the parameter of the first set of parameters;
receive the additional information from the user device; and where the one or more processors, when generating the new schedule, are to:
generate the new schedule using the information included in the first request and the additional information.

5. The device of claim 1, where the one or more processors are further to:
provide the driver information and the route information included in the first request as input to a routing function to cause the routing function to output the set of routes to use to perform the set of deliveries, where each route, of the set of routes, is assigned to a vehicle, of the fleet of vehicles.

6. The device of claim 1, where the one or more processors are further to:
obtain, after determining that the first request includes the first set of parameters, supplemental information from a server device,
the supplemental information including at least one of:
vehicle information associated with the fleet of vehicles,
additional driver information,
weather information, or
traffic information; and
provide the driver information, the route information, and the supplemental information as input to a routing function to cause the routing function to output the set of routes to use to perform the set of deliveries.

7. The device of claim 1, where the one or more processors, when modifying the new schedule, are to:
receive a request to modify the new schedule; and
modify the new schedule based on information included in the request to modify the new schedule,
where modifying the new schedule includes using a routing function to re-determine the set of routes to be used for performing the set of deliveries.

8. A non-transitory computer-readable medium storing instructions, the instructions comprising:
one or more instructions that, when executed by one or more processors, cause the one or more processors to:
receive, from a user device, a request for a schedule that assigns a fleet of vehicles to a set of deliveries, wherein the request for the schedule is:
a first request to generate a new schedule, or
a second request to load an existing schedule;
determine that a first parameter, of a first set of parameters needed to generate the new schedule, is not included in the first request or that at a second parameter, of a second set of parameters needed to load the existing schedule, is not included in the second request;
obtain the first parameter or the second parameter using:
a historical user request comprising:
analysis of a set of historical user requests to identify the historical user request, the historical user request satisfying a threshold level of similarity with the first request or with the second request,
identify a historical parameter included in the historical user request that is not included in the first request or in the second request,
obtain the historical parameter included in the historical user request, and use the historical parameter as the first parameter or as the second parameter, the historical parameter to be provided to the user device as a recommended parameter or to be automatically used to generate the new schedule or to obtain the existing schedule,
generate the new schedule or obtain the existing schedule based on information included in the request and the first parameter or the second parameter, wherein the new schedule or the existing schedule is generated based on one or more machine learning or artificial intelligence techniques, the new schedule or the existing schedule including:
driver information for a team of drivers associated with the fleet of vehicles, and
route information for a set of routes to be used for performing the set of deliveries,
wherein the machine learning comprises:
training a data model using a set of historical data schedules; and
providing information included in the request as input to the data model to cause the data model to output one or more coefficient values associated with particular routes, of the set of routes to be used as part of the new schedule, and to generate a recommendation to use the particular routes with scores satisfying a threshold value;
provide the new schedule or the existing schedule to at least one of:
the user device, or
one or more devices associated with the fleet of vehicles carrying out the set of deliveries;
receive, while the fleet of vehicles are carrying out the set of deliveries, a trigger;
modify the new schedule or the existing schedule based on the trigger; and
provide the modified new schedule or the modified existing schedule to at least one of:
the user device, or
the one or more devices associated with the fleet of vehicles carrying out the set of deliveries.

9. The non-transitory computer-readable medium of claim 8, where the one or more instructions, when executed by the one or more processors, further cause the one or more processors to:
obtain, after determining that the first request includes the first set of parameters, supplemental information from a server device,
the supplemental information including at least one of:
vehicle information associated with the fleet of vehicles, or
traffic information; and
provide the driver information, the route information, and the supplemental information as input to a routing function to cause the routing function to output the set of routes to use to perform the set of deliveries.

10. The non-transitory computer-readable medium of claim 8, where the one or more instructions, when executed by the one or more processors, further cause the one or more processors to:
determine that the second request does not include a parameter of the second set of parameters;
provide a request for additional information to the user device,
where the request for additional information includes the parameter of the second set of parameters;
receive the additional information from the user device; and
load the existing schedule using the information included in the request and the additional information.

11. The non-transitory computer-readable medium of claim 8, where the trigger to modify the new schedule or the existing schedule is:
  a request to modify the new schedule or the existing schedule,
  supplemental information obtained from a server device, or
  an output generated by a forecasting technique.

12. A method, comprising:
  receiving, by a device and from a user device, a request for a schedule that assigns a fleet of vehicles to a set of deliveries, wherein the request for the schedule is:
    a first request to generate a new schedule, or
    a second request to load an existing schedule;
  determining, by the device, that a first parameter, of a first set of parameters needed to generate the new schedule, is not included in the first request or that at a second parameter, of a second set of parameters needed to load the existing schedule, is not included in the second request;
  obtaining, by the device, the first parameter or the second parameter using:
    a historical user request comprising:
      analysis of a set of historical user requests to identify the historical user request, the historical user request satisfying a threshold level of similarity with the first request or with the second request,
      identify a historical parameter included in the historical user request that is not included in the first request or in the second request,
      obtain the historical parameter included in the historical user request, and use the historical parameter as the first parameter or as the second parameter, the historical parameter to be provided to the user device as a recommended parameter or to be automatically used to generate the new schedule or to obtain the existing schedule,
    generating, by the device, the new schedule or obtain the existing schedule based on information included in the request and the first parameter or the second parameter, wherein the new schedule or the existing schedule is generated based on one or more machine learning or artificial intelligence techniques, the new schedule or the existing schedule including:
      driver information for a team of drivers associated with the fleet of vehicles, and
      route information for a set of routes to be used for performing the set of deliveries,
        wherein the machine learning comprises:
          training a data model using a set of historical data schedules; and
          providing information included in the request as input to the data model to cause the data model to output one or more coefficient values associated with particular routes, of the set of routes to be used as part of the new schedule, and to generate a recommendation to use the particular routes with scores satisfying a threshold value;
    providing, by the device, the new schedule or the existing schedule to at least one of:
      the user device, or
      one or more devices associated with the fleet of vehicles carrying out the set of deliveries;
  receiving, by the device and while the fleet of vehicles are carrying out the set of deliveries, a trigger;
  modifying, by the device, the new schedule or the existing schedule based on the trigger; and
  providing, by the device, the modified new schedule or the modified existing schedule to at least one of:
    the user device, or
    the one or more devices associated with the fleet of vehicles carrying out the set of deliveries.

13. The method of claim 12, where modifying the existing schedule comprises:
  receiving a request to modify the existing schedule,
  modifying the existing schedule based on information included in the request to modify the existing schedule,
  where modifying the existing schedule includes using a routing function to re-determine the set of routes to be used for performing the set of deliveries.

14. The method of claim 12, where modifying the new schedule or the existing schedule based on the trigger comprises:
  receiving, from the user device, a request to modify the new schedule or the existing schedule, where the request to modify the new schedule or the existing schedule is at least one of:
    a request to add a driver, to the team of drivers,
    a request to remove a driver, from the team of drivers,
    a request to add a delivery, to the set of deliveries, or
    a request to remove a delivery, from the set of deliveries.

15. The method of claim 12, further comprising:
  receiving real-time information associated with the set of deliveries,
  the real-time information including:
    a current geographic location of each delivery vehicle, of a set of vehicles used to perform the set of deliveries, and
    a status of each delivery, of the set of vehicles,
  re-determining the set of routes for the set of deliveries by providing the information included in the request and the real-time information as input to a routing function,
  the routing function to output a new set of routes,
  determining that the new set of routes is a shorter total distance than the set of routes, and
  adding the new set of routes to the new schedule or to the existing schedule.

16. The method of claim 12, further comprising:
  obtaining weather information and traffic information for a geographic region associated with the set of deliveries,
  receiving real-time information associated with the set of deliveries,
  the real-time information including:
    a current geographic location of each vehicle, of the fleet of vehicles used to perform the set of deliveries, and
    a status of each delivery, of the fleet of vehicles,
  re-determining the set of routes for the set of deliveries by providing the weather information, the traffic information, and the real-time information as input to a routing function,
  the routing function to output a new set of routes,
  determining that the new set of routes is associated with a shorter total distance than a total distance associated with the set of routes, and
  adding the new set of routes to the new schedule or to the existing schedule.

17. The method of claim 12, further comprising:
  executing a forecasting technique to determine a likelihood of a particular scheduling modification occurring,
  the forecasting technique to analyze the set of historical data schedules and a set of historical modification requests to determine the likelihood of the particular scheduling modification occurring, determining that the likelihood of the particular scheduling modification occurring is greater than a threshold value, and modifying the new schedule or the existing schedule prior to the particular scheduling modification occurring, based on determining that the likelihood of the particular scheduling modification occurring is greater than the threshold value.

\* \* \* \* \*